(12) United States Patent
Montero et al.

(10) Patent No.: US 12,113,932 B2
(45) Date of Patent: Oct. 8, 2024

(54) TRANSCRIPTION COMMUNICATION

(71) Applicant: Sorenson IP Holdings, LLC, Salt Lake City, UT (US)

(72) Inventors: Adam Montero, Midvale, UT (US); David Thomson, Bountiful, UT (US); Tori Walton, South Salt Lake, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 408 days.

(21) Appl. No.: 17/504,268

(22) Filed: Oct. 18, 2021

(65) Prior Publication Data
US 2023/0122555 A1    Apr. 20, 2023

(51) Int. Cl.
*H04M 3/42* (2006.01)
*G10L 15/26* (2006.01)
*H04W 4/80* (2018.01)
*H04W 12/71* (2021.01)

(52) U.S. Cl.
CPC ......... *H04M 3/42391* (2013.01); *G10L 15/26* (2013.01); *H04W 4/80* (2018.02); *H04W 12/71* (2021.01)

(58) Field of Classification Search
CPC ......... H04M 3/42391; H04M 2201/40; H04M 3/42382; G10L 15/26; H04W 4/80; H04W 12/71; H04W 12/06; H04W 12/088; H04W 12/65; H04L 63/08; H04L 63/101; H04L 63/18
See application file for complete search history.

(56) References Cited

U.S. PATENT DOCUMENTS

| | | | | |
|---|---|---|---|---|
| 5,724,405 A * | 3/1998 | Engelke | ............... | H04M 11/062 379/93.28 |
| 5,974,116 A * | 10/1999 | Engelke | ............... | H04M 11/066 379/93.28 |
| 6,075,842 A * | 6/2000 | Engelke | ............... | H04M 11/066 379/93.08 |
| 6,493,426 B2 * | 12/2002 | Engelke | ................. | G10L 15/26 704/E15.045 |
| 6,504,910 B1 * | 1/2003 | Engelke | ............... | H04M 7/006 379/93.08 |

(Continued)

*Primary Examiner* — Lisa Hashem
(74) *Attorney, Agent, or Firm* — Maschoff Brennan

(57) ABSTRACT

A method of transcription communication may include obtaining, at a first device, audio data during a communication session between the first device and a remote device. The audio data may be obtained from a public switched telephone network. The method may also include directing the audio data from the first device to a second device over a short-range wireless network. The second device may host the short-range wireless network. The method may further include directing the audio data from the second device to a remote transcription system over a wireless cellular network and obtaining, at the second device, transcript data from the remote transcription system over the wireless cellular network. The method may also include limiting data transmitted and received over the wireless cellular network as authorized by the second device to data associated with transcription of audio obtained by the first device over the public switched telephone network.

18 Claims, 6 Drawing Sheets

(56) References Cited

U.S. PATENT DOCUMENTS

| | | | | |
|---|---|---|---|---|
| 6,510,206 | B2 * | 1/2003 | Engelke | H04M 3/42391 |
| | | | | 379/88.04 |
| 6,513,003 | B1 * | 1/2003 | Angell | H04L 65/612 |
| | | | | 704/235 |
| 6,549,611 | B2 * | 4/2003 | Engelke | H04M 3/42391 |
| | | | | 379/52 |
| 6,594,346 | B2 * | 7/2003 | Engelke | H04M 11/066 |
| | | | | 379/100.09 |
| 6,603,835 | B2 * | 8/2003 | Engelke | H04M 3/42382 |
| | | | | 379/88.07 |
| 6,816,468 | B1 * | 11/2004 | Cruickshank | H04L 12/1813 |
| | | | | 379/202.01 |
| 7,660,398 | B2 * | 2/2010 | Engelke | H04M 15/41 |
| | | | | 379/93.07 |
| 7,881,441 | B2 * | 2/2011 | Engelke | G10L 15/26 |
| | | | | 379/90.01 |
| 7,934,148 | B2 * | 4/2011 | Bobo, II | H04M 3/4938 |
| | | | | 715/208 |
| 8,014,765 | B2 * | 9/2011 | Pettinato | G10L 15/26 |
| | | | | 704/235 |
| 8,886,169 | B2 * | 11/2014 | Hussain | H04W 4/023 |
| | | | | 709/200 |
| 9,674,341 | B1 * | 6/2017 | Pakidko | H04M 3/2281 |
| 9,946,842 | B1 * | 4/2018 | Stringham | G16H 80/00 |
| 9,997,155 | B2 * | 6/2018 | Grost | G10L 15/02 |
| 10,833,920 | B1 * | 11/2020 | Ramanadham | H04L 69/40 |
| 11,276,392 | B2 * | 3/2022 | Thomson | G10L 15/30 |
| 11,580,985 | B2 * | 2/2023 | Spry | G10L 15/26 |
| 11,765,017 | B2 * | 9/2023 | Ramanadham | H04L 41/0661 |
| | | | | 455/419 |
| 2004/0083105 | A1 * | 4/2004 | Jaroker | G10L 15/26 |
| | | | | 704/E15.045 |
| 2005/0063409 | A1 * | 3/2005 | Oommen | H04L 67/02 |
| | | | | 370/432 |
| 2005/0190893 | A1 * | 9/2005 | Stephens | H04L 12/66 |
| | | | | 379/52 |
| 2006/0095259 | A1 * | 5/2006 | Bahl | H04M 3/4936 |
| | | | | 704/235 |
| 2007/0280439 | A1 * | 12/2007 | Prywes | G10L 15/26 |
| | | | | 379/88.18 |
| 2012/0250836 | A1 * | 10/2012 | Engleke | H04M 1/21 |
| | | | | 379/52 |
| 2013/0102288 | A1 * | 4/2013 | Hussain | G10L 15/26 |
| | | | | 455/414.1 |
| 2014/0372115 | A1 * | 12/2014 | LeBeau | H04M 1/72436 |
| | | | | 704/235 |
| 2015/0011251 | A1 * | 1/2015 | Parker | H04M 3/42382 |
| | | | | 455/466 |
| 2017/0295475 | A1 * | 10/2017 | Patel | H04W 4/10 |
| 2018/0041247 | A1 * | 2/2018 | Zakaria | H04B 3/542 |
| 2023/0141096 | A1 * | 5/2023 | Bleak | G06F 40/166 |
| | | | | 704/270 |

* cited by examiner

TRANSCRIPTION COMMUNICATION

FIELD

The embodiments discussed herein are related to communication of transcriptions.

BACKGROUND

Audio communications may be performed using different types of devices. In some instances, people that are hard-of-hearing or deaf may need assistance to participate in the audio communications. In these instances, transcriptions of the audio may be provided to the hard-of-hearing or deaf. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method of transcription communication may include obtaining, at a first device, audio data during a communication session between the first device and a remote device. The audio data may be obtained from a public switched telephone network. The method may also include directing the audio data from the first device to a second device over a short-range wireless network. The second device may host the short-range wireless network. The method may further include directing the audio data from the second device to a remote transcription system over a wireless cellular network and obtaining, at the second device, transcript data from the remote transcription system over the wireless cellular network. The transcript data may include a transcription of the audio data. The method may also include limiting data transmitted and received over the wireless cellular network as authorized by the second device to data associated with transcription of audio obtained by the first device over the public switched telephone network.

BRIEF DESCRIPTION OF THE DRAWINGS

Example embodiments will be described and explained with additional specificity and detail through the use of the accompanying drawings in which.

DESCRIPTION OF EMBODIMENTS

Hard-of-hearing people may use one or more devices with a display during communication sessions to assist their understanding of the communication sessions. For example, a transcription of audio of a communication session may be presented in real-time or substantially real-time on a display of a device of a hard-of-hearing person. As a result, the hard-of-hearing person may read the words spoken by a second party during the communication session as well as listen to the words to achieve better understanding during the communication session. In these and other circumstances, to obtain the transcription of the audio, the audio of the communication session may be directed to a transcription system during the communication session. The transcription system may generate the transcription of the audio during the communication session and send the transcription to the device for presentation of the transcription by the device.

Currently, some devices that present transcriptions during communication sessions use Internet protocols (IP) networks connections through an Internet service provider to direct audio to and receive transcriptions from a transcription system for communication sessions conducted over analog voice network, such as a public switched telephone network (PSTN). However, not all hard-of-hearing users have access to an Internet service provider. Some embodiments in this disclosure relate to systems and methods that may be used to send audio to and receive transcriptions from a transcription system without use of IP network connections through an Internet service provider. For example, in some embodiments, the transcription of the audio may be directed back to a device over a wireless cellular network.

In some embodiments, the systems and methods described in this disclosure may be configured to limit data transmitted and received over the wireless cellular network to data associated with transcription of audio obtained over the public switched telephone network. For example, the systems and methods described in this disclosure may limit access to the wireless cellular network to devices that capture audio for transcriptions and present the transcriptions. As another example, the systems and methods described in this disclosure may limit devices that access the Internet or other networks using the wireless cellular network to certain networks or domains.

The systems and methods described in this disclosure may thus provide new and improved systems and methods to provide transcriptions of audio to a device. Furthermore, the systems and methods described in this disclosure may improve technology with respect to audio communications and communication of transcriptions between devices.

Figure 1:
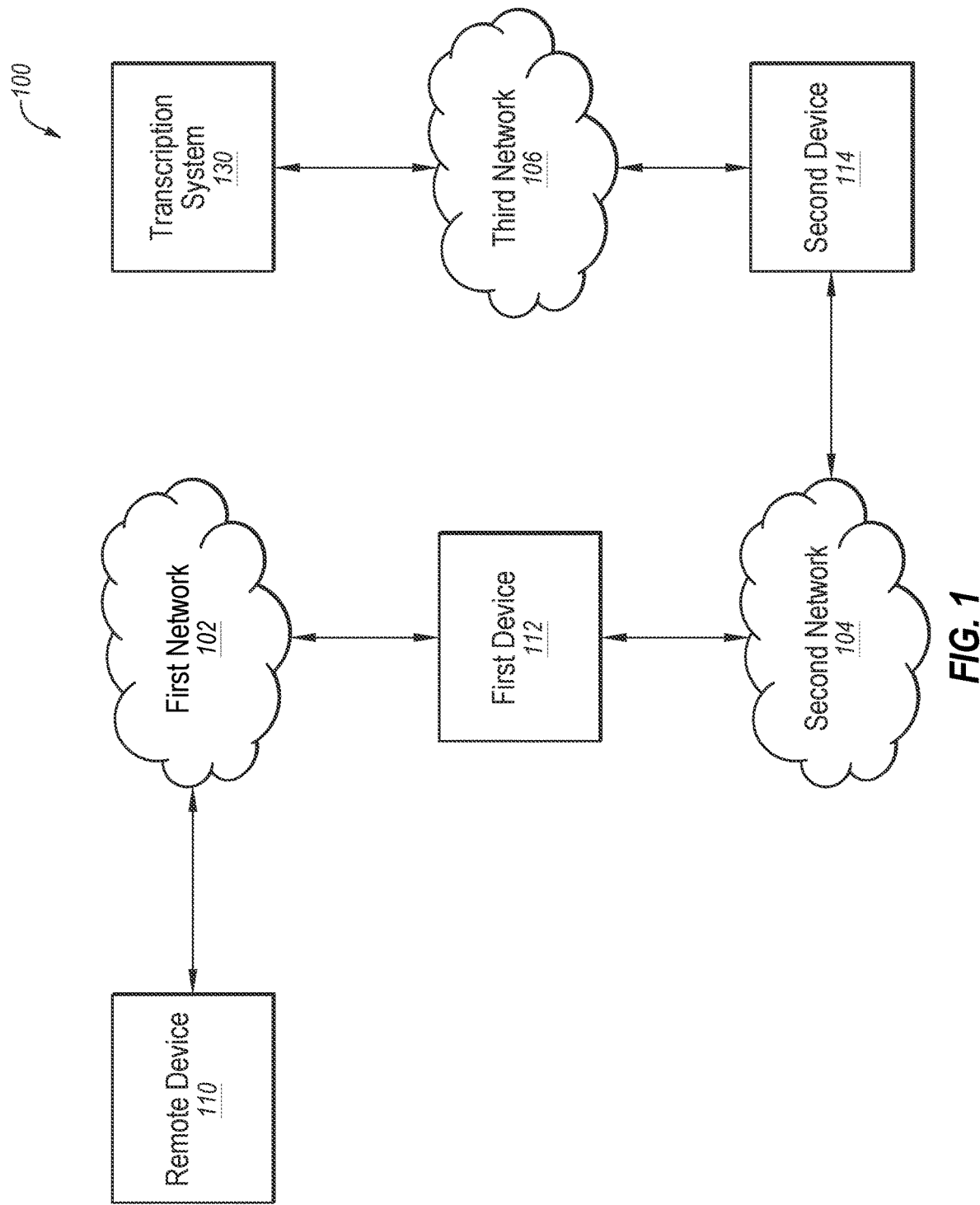
FIG. 1 illustrates an example environment for communication of transcriptions.

Turning to the figures, FIG. 1 illustrates an example environment 100 for communication of transcriptions. The environment 100 may be arranged in accordance with at least one embodiment described in the present disclosure. The environment 100 may include a first network 102, a second network 104, a third network 106, a remote device 110, a first device 112, a second device 114, and a transcription system 130.

The first network 102 may be configured to communicatively couple the remote device 110 and the first device 112. In some embodiments, the first network 102 may include any short-range wireless network, such as a wireless local area network (WLAN), a personal area network (PAN), or a wireless mesh network (WMN). For example, the first network 102 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, Digital Enhanced Cordless Telecommunications (DECT) networks, among other types of LANS, PANS, and WMNS. In some embodiments, the first network 102 may include an Internet Protocol (IP) based network such as the Internet that is provided by an Internet service provider (ISP). In some embodiments, the first network 102 may include cellular communication networks for sending and receiving communications and/or data including via hypertext transfer protocol (HTTP), direct data connection, wireless application protocol (WAP), etc. The first network 102 may also include a mobile data network that may include third-generation (3G), fourth-generation (4G), fifth-generation (5G), long-term evolution (LTE), long-term evolution advanced (LTE-A), Voice-over-LTE ("VoLTE") or any other mobile data network or combination of mobile data networks. In these or other embodiments, the network may include any combination of analog, digital, and/or optical networks that form a public switched telephone network (PSTN) that may transport audio of a communication session.

Each of the remote device 110 and the first device 112 may be any electronic or digital computing device. For example, each of the remote device 110 and the first device 112 may include a desktop computer, a laptop computer, a smartphone, a mobile phone, a tablet computer, a telephone, a VoIP (Voice over IP) phone, a phone console, a caption device, a captioning telephone, or any other computing device that may be used for communication between users of the remote device 110 and the first device 112.

In some embodiments, each of the remote device 110 and the first device 112 may include memory and at least one processor, which are configured to perform operations as described in this disclosure, among other operations. In some embodiments, each of the remote device 110 and the first device 112 may include computer-readable instructions that are configured to be executed by each of the remote device 110 and the first device 112, respectively, to perform operations described in this disclosure.

In some embodiments, each of the remote device 110 and the first device 112 may be configured to establish communication sessions with other devices. For example, each of the remote device 110 and the first device 112 may be configured to establish an outgoing communication session, such as a telephone call, video call, or other communication session, with another device over a telephone line or other network, such as a portion of the first network 102. For example, each of remote device 110 and the first device 112 may communicate over a wireless cellular network, a wired Ethernet network, an optical network, and/or a PSTN line.

In some embodiments, each of the remote device 110 and the first device 112 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the remote device 110 may be configured to obtain first audio from a first user. For example, the remote device 110 may obtain the first audio from a microphone of the remote device 110 or from another device that is communicatively coupled to the remote device 110. The remote device 110 may be configured to direct, to the first device 112, the audio of a communication session between the remote device 110 and the first device 112. In these and other embodiments, the first device 112 may also direct the audio to the transcription system 130.

The transcription system 130 may include any configuration of hardware, such as processors, servers, and storage servers that are networked together and configured to perform a task. For example, the transcription system 130 may include one or multiple computing systems, such as multiple servers that each include memory and at least one processor. The transcription system 130 may be configured to generate transcriptions from audio. The audio may include audio from the remote device 110, from the first device 112, or both the remote device 110 and the first device 112.

In some embodiments, the transcription system 130 may be an automatic system that automatically recognizes speech independent of human interaction to generate the transcription. In these and other embodiments, the transcription system 130 may include speech engines that are trained to recognize speech. The speech engine may be trained for general speech and not specifically trained using speech patterns of the participants in the communication session. Alternatively or additionally, the speech engine may be specifically trained using speech patterns of one or both of the participants of the communication session.

Alternatively or additionally, the transcription system 130 may be a re-voicing system. In a re-voicing system, a human may listen to the audio and re-voice or speak the words in the audio. The re-voiced audio may be provided to a speech recognition system that is trained for the speech of the human that is re-voicing the audio. In some embodiments, the speech recognition system may listen to the audio of the communication session and/or the re-voiced audio. Additionally or alternatively, the speech recognition system may output a transcription of the re-voiced audio and/or of the audio without re-voicing. In these or other embodiments, the transcription system 130 may be a combination of an interface to a human transcriber and one or more speech engines in various configurations. For example, a speech engine may create a transcription based on audio of the communication session and a human transcriber may listen to the same audio and correct the transcription. Additionally or alternatively, the speech engine may create a first transcription and the human transcriber may create a second transcription and the two transcriptions may be fused into a single transcription.

As described, in some embodiments, the transcription system 130 may generate a transcription of audio. The transcription system 130 may also direct the transcription of the audio to the first device 112. The first device 112 may be configured to present the transcription received from the transcription system 130. For example, the first device 112 may be configured to display the received transcriptions on a display that is part of the first device 112 or a display of a device that is communicatively coupled to the first device 112. In some embodiments, the transcription system 130 may provide captions to multiple devices simultaneously. In some embodiments, the transcription system 130, first device 112, and/or another system may create and maintain a record of displays selected to show captions for one or more communication sessions. In instances in which a device associated with a first display is conducting a communication session, it may retrieve the record of displays and send a connect message to one or more other displays or to a routing system configured to direct captions to displays.

In some embodiments, the second device 114 may be configured to relay data between the first device 112 and the transcription system 130 using the second network 104 and the third network 106. In these and other embodiments, the second device 114 may be any electronic or digital computing device. For example, the second device 114 may include a routing device, a network connection device such as a hotspot device or hub, a desktop computer, a laptop computer, a smartphone, a mobile phone, a tablet computer, or any other computing device that may be used to relay data. In these and other embodiments, the second device 114 may include memory and at least one processor, which may be configured to perform operations as described in this disclosure, among other operations. In some embodiments, the second device 114 may include computer-readable instructions that are configured to be executed by the second device 114 to perform operations described in this disclosure.

In some embodiments, the second network 104 may include a short-range communication network, such as a wireless local area network (WLAN), a personal area network (PAN), or a wireless mesh network (WMN). For example, the second network 104 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, Digital Enhanced Cordless Telecommunications (DECT) networks, among other types of LANS, PANS, and WMNS. Alternately or additionally, the second network 104 may include a wired connection such as a wired router, a USB or USB-C connection, a Thunderbolt connection, a Lightning connection, a packet-based connection such as an Ethernet cable, or an optical connection. In some embodiments, the second network 104 may include a short-range wireless communication network In some embodiments, the second network 104 may be configured to communicatively couple the first device 112 and the second device 114. In these and other embodiments, the second network 104 may be configured to transfer audio of a communication session that occurs between the remote device 110 and the first device 112. The second network 104 may transfer the audio between the first device 112 and the second device 114. Alternately or additionally, the second network 104 may be configured to transfer transcriptions of audio of a communication session that occurs between the remote device 110 and the first device 112 that are generated by the transcription system 130. The second network 104 may transfer the transcriptions between the first device 112 and the second device 114. The second network 104 may also be configured to transfer other data between the first device 112 and the second device 114.

The third network 106 may include a wide area network. In some embodiments, the third network 106 may include an Internet Protocol (IP) based network such as the Internet that is provided by an Internet service provider (ISP). In some embodiments, the third network 106 may include cellular communication networks for sending and receiving communications and/or data including via hypertext transfer protocol (HTTP), direct data connection, wireless application protocol (WAP), etc. Alternately or additionally, the third network 106 may also include a mobile data network that may include third-generation (3G), fourth-generation (4G), fifth-generation (5G), long-term evolution (LTE), long-term evolution advanced (LTE-A), Voice-over-LTE ("VoLTE") or any other mobile data network or combination of mobile data networks.

In some embodiments, the third network 106 may be configured to communicatively couple the second device 114 and the transcription system 130. In these and other embodiments, the third network 106 may be configured to transfer audio, transcriptions, and other data between the second device 114 and the transcription system 130. In some embodiments, the third network 106 may be controlled by a wireless telecommunications provider or some other network provider.

An example of the operation of the environment 100 is now provided. In some embodiments, a communication session between the remote device 110 and the first device 112 may be established such that audio originating at the remote device 110 is directed to the first device 112 over the first network 102. The first device 112 may present the audio for a user of the first device 112. The first device 112 may also direct the audio to the second device 114 over the second network 104. The second device 114 may direct the audio to the transcription system 130 over the third network 106. The transcription system 130 may generate a transcription of the audio and direct the transcription to the second device 114 over the third network 106. The second device 114 may direct the transcription to the first device 112 over the second network 104. The first device 112 may present the transcription of the audio to a user of the first device 112.

In some embodiments, the third network 106 may be a general mobile data network that is configured to access the Internet. As a result, any device able to access the second network 104 may be able to direct data to the second device 114 for transmission over the third network 106. In these and other embodiments, one or more methods to secure the second device 114, the second network 104, and/or the first device 112 may be employed to help to prevent unauthorized use of the second device 114 to direct data over the third network 106.

In some embodiments, the systems and methods described herein may limit data transmitted and received over the third network 106 to data associated with transcription of audio obtained by the first device 112 over the first network 102 from the remote device 110. In these and other embodiments, the systems and methods described herein may limit data transmitted and received over the third network 106 as authorized by the second device to data associated with transcription of the audio obtained from the remote device 110.

In some embodiments, the data associated with the transcription of audio received from the remote device 110 may include the audio obtained from the remote device 110 and transcriptions of the audio obtained from the transcription system 130. Alternately or additionally, the data may include data associated with the transcription system 130. For example, the transcription system 130 may provide updates to the first device 112 over the third network 106. Alternately or additionally, the first device 112 may provide data metrics or other information about the first device 112 or the user of the first device 112 that is associated with the transcription system 130. In these and other embodiments, data associated with the transcription of audio received from the remote device 110 may include any data that originates from, is authorized by, or otherwise is associated with the transcription system 130.

In some embodiments, limiting data transmitted and received over the third network 106 may include monitoring an amount or type of data transmitted and/or received over the third network 106.

For example, the second device 114, the transcription system 130, or a system associated with the third network 106 may be configured to monitor an amount of total download data received over the third network 106 at the second device 114 within a particular time period. In these and other embodiments, the first device 112, the second device 114, and/or the transcription system 130 may be configured to monitor an amount of transcript data associated with the transcriptions sent to the first device 112 from the transcription system 130 over the third network 106. Alternately or additionally, the first device 112, the second device 114, and/or the transcription system 130 may be configured to monitor other download data obtained by the first device 112 from the transcription system 130 within the particular time period. For example, the other download data may include update data and/or configuration data, among other types of data that may be provided by the transcription system 130 to the first device 112 within the particular time period. The transcript data and the other download data may be referred to as authorized download data.

A device within the system, such as the first device 112, the second device 114, and/or the transcription system 130 may be configured to compare an amount of the total download data to an amount of the authorized download data within the particular time period. The comparison may include determining a difference or ratio between the amounts of the total download data and the authorized download data. In these and other embodiments, the difference or ratio may be compared to a download threshold. If the difference or ratio satisfies the download threshold, it may be determined that data not associated with transcription of audio obtained by the first device 112 is being obtained over the third network 106. The download threshold may be greater than zero to avoid differences in accounting for the amounts of data. For example, the download threshold may be adjusted based on the devices that provide the information. For example, obtaining the information from the transcription system 130 for the amount of authorized data may result in a first download threshold and obtaining the information from the first device 112 for the amount of authorized data may result in a second download threshold. The download threshold may assist in not assuming improper use of the second device 114 for obtaining data from the third network 106 due to differences in calculating amounts of data.

Alternately or additionally, a device within the system, such as the first device 112, the second device 114, and/or the transcription system 130 may be configured to compare an amount of the total upload data sent by the second device 114 over the third network 106 to an amount of the authorized upload data sent by the second device 114 over the third network 106 within a particular time period. The authorized upload data may be composed of audio provided to the transcription system 130 and other information provided by the first device 112 to the transcription system 130. The comparison may include determining a difference or ratio between the amounts of the total upload data and the authorized upload data. In these and other embodiments, the difference may be compared to an upload threshold. If the difference or ratio satisfies the upload threshold, it may be determined that data not associated with transcription of audio obtained by the first device 112 is being transmitted over the third network 106. The upload threshold may be determined in a similar manner as the download threshold.

In some embodiments, it may be determined that data not associated with transcription of audio obtained by the first device 112 is being transmitted over the third network 106 based on one or both of the upload and download thresholds being satisfied. Alternately or additionally, it may be determined that data not associated with transcription of audio obtained by the first device 112 is being transmitted over the third network 106 based on a total data transmitted over a period. The total data transmitted may be a combination of total upload data and total downloaded data over the period. The total data may include authorized data and unauthorized data. In these and other embodiments, it may be determined that data not associated with transcription of audio obtained by the first device 112 is being transmitted over the third network 106 based on the total data satisfying a total data threshold. In these and other embodiments, the total data threshold may be selected based on average, maximum, or some other calculation related to typically total data usage for authorized data over the period. When data not associated with transcription of audio obtained by the first device 112 is being transmitted over the third network 106, it may be referred to in this disclosure as improper use of the third network 106.

In response to improper use of the third network 106, different actions may occur. For example, in some embodiments, an operator of the third network 106 may be contacted and the credentials to allow the second device 114 to access the third network 106 may be suspended. This contact may occur via electronic means such as email, communication via an API, or using other methods. Alternately or additionally, the second device 114 may be disabled by the transcription system 130 such that the second device 114 may not connect to the third network 106. In some embodiments, disabling the second device 114 may include disabling the second device 114 in a manner such that the first device 112 may reenable the second device 114. For example, the first device 112 may provide a code to the second device 114 to reenable the second device 114 in response to input from a user of the first device 112 and/or an indication that the inappropriate usage of the second device 114 has stopped.

Alternately or additionally, an ability of a user of the first device 112 that is associated with the transcription system 130, such as being a customer of a service provided by the transcription system 130, to access or receive services from the transcription system 130 may be reduced or limited. For example, the user may not receive transcriptions of audio of communication sessions with the remote device 110 or other devices in response to improper use of the third network 106.

In some embodiments, a user of the first device 112 may be contacted when improper use of the third network 106 is occurring. This contact may be a result of an automated message provided to a call center agent who may contact the user or by an electronic message sent to the user by email, text, automated phone call, or by other automated means. In these and other embodiments, the actions associated with improper user may occur after contacting the user and may be responsive to the user's action or inaction. Alternately or additionally, the actions associated with improper user may occur after contacting the user and further improper use of the third network 106 occurs. In some embodiments, the use of the third network 106 may be continued to be monitored and if improper use of the third network 106 has ended, the actions resulting from improper use may be discontinued.

In some embodiments, limiting data transmitted and received over the third network 106 may include configuring the second device 114 and/or the third network 106 such that only domains associated with the transcription system 130 may be accessed by the second device 114 using the third network 106. Alternately or additionally, limiting data transmitted and received over the third network 106 may include configuring the environment 100 such that credentials to access the third network 106 stored in an integrated circuit, such as a subscriber identification module (SIM), may be used to access the third network 106 only when the integrated circuit is used with the second device 114. Alternately or additionally, limiting data transmitted and received over the third network 106 may include configuring the third network 106 such that an integrated circuit associated with the transcription system 130 may only be used to access the third network 106 for data associated with the transcription of audio service provided by the transcription system 130. Further examples regarding configurations involving an integrated circuit with credentials to access the third network 106 are discussed with respect to FIGS. 2 and 3.

In some embodiments, limiting data transmitted and received over the third network 106 may include configuring the second network 104 such that only authorized devices may access the second network 104 and provide data to the second device 114 for transmission over the third network 106. For example, the second network 104 may be secured such that only authorized devices, such as the first device 112, may access the second network 104. Further examples of how the second network 104 may be secured are discussed with respect to FIG. 4.

Modifications, additions, or omissions may be made to the environment 100 and/or the components operating in the environment 100 without departing from the scope of the present disclosure. For example, in some embodiments, the environment 100 may be integrated into other environments that provide additional benefits for a user of the environment 100.

Figure 2:
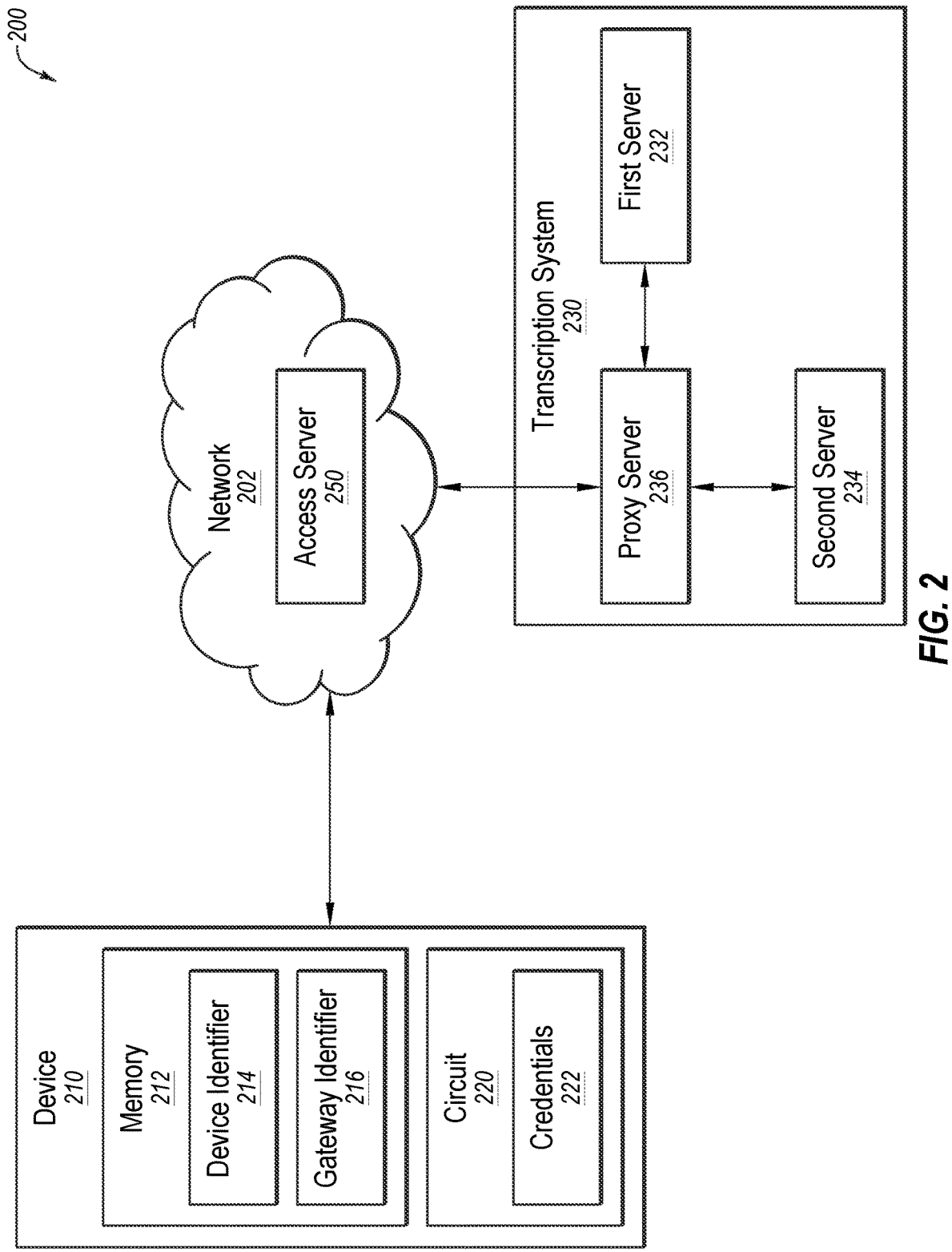
FIG. 2 illustrates another example environment for communication of transcriptions.

FIG. 2 illustrates another example environment 200 for communication of transcriptions. The environment 200 may be arranged in accordance with at least one embodiment described in the present disclosure. The environment 200 may include a network 202 that includes an access server 250, a device 210, a transcription system 230, and an access server 250.

In some embodiments, the network 202, the device 210, and the transcription system 230 may include various aspects that are analogous to the third network 106, the second device 114, and the transcription system 130, respectively, of FIG. 1. Accordingly, only further explanation is provided with respect thereto and the description of FIG. 1 is applicable to the description of FIG. 2.

The device 210 may include a memory 212 that includes a device identifier 214 and a gateway identifier 216. The device 210 may also include an integrated circuit 220 that includes credentials 222.

The device identifier 214 may include an International Mobile Equipment Identity (IMEI), a media access control (MAC) address, or some other identifier of the device 210. The gateway identifier 216 may include an access point name (APN) structure that is assigned to the device 210 to allow the device to access external networks. For example, the gateway identifier 216 may include information that may allow the network 202, in particular, the access server 250, to determine a network, such a private network, the Internet, or other network, to connect to the device 210 by way of the network 202. The network 202 may act as link between the device 210 and the network specified in the gateway identifier 216. In some embodiments, the gateway identifier 216 may further include parameters that may be used by the network 202 to establish the link between the device 210 and the network, such as an IP address to assign to the device 210 and security methods to employ for the link, among other information.

The integrated circuit 220 may be a circuit configured to store credentials 222 for accessing the network 202. In some embodiments, the integrated circuit 220 may be removable and coupled to the device 210. For example, the integrated circuit 220 may be part of a smaller chip that may be placed in communication with the device 210 or removed from communication with the device 210 and placed into communication with another device. As an example, the integrated circuit 220 may be a SIM card. In these and other embodiments, the integrated circuit 220 may include an operating system configured to securely store the credentials 222, such as an international Mobile Subscriber Identity (IMSI) and related keys, that may be used to identify and authenticate a device to allow the device to access the network 202.

The access server 250 may include any configuration of hardware, such as processors, servers, and storage servers that are networked together and configured to perform a task. For example, the access server 250 may include one or multiple computing systems, such as multiple servers that each include memory and at least one processor. The access server 250 may be configured to assist in granting the device 210 access to the network 202 among other networks, such as the Internet or private networks. For example, the device 210 may provide the device identifier 214, the gateway identifier 216, and the credentials 222 to the access server 250. The access server 250 may analyze the device identifier 214, the gateway identifier 216, and the credentials 222 to determine to grant the device 210 access to the network 202 and/or a network to link to the device 210 using the network 202.

In some embodiments, the device identifier 214, the gateway identifier 216, and/or the credentials 222 may be configured to limit data transmitted and received over the network 202 to data associated with the transcription system 230. Alternately or additionally, the analysis performed by the access server 250 may be configured to limit data transmitted and received over the network 202 to data associated with the transcription system 230 when granting access to the device 210.

In some embodiments, access to the network 202 may be based on the credentials 222 and on other information provided by the device 210. For example, the credentials 222 may be associated with information. Thus, to access the network 202, the device 210 may provide both the integrated circuit 220 and the information to the network 202. As a result, if the integrated circuit 220 is used with another device that does not include the information, the connection to the network 202 may be denied. In some embodiments, the other information may be the device identifier 214, the gateway identifier 216, a model of the device 210, or another identifier or key stored in the memory 212 of the device 210.

As an example of operation, the device 210 may provisionally connect to the network 202. The network 202 may request credentials and information to allow for the device 210 to connect to the network 202. The device 210 may provide the credentials 222, the device identifier 214, the gateway identifier 216, and/or other information to the access server 250.

The access server 250 may analyze the credentials 222 to determine if the credentials 222 grants access to the network 202. The access server 250 may further analyze the other information to determine if the integrated circuit 220 is requesting permission for a device 210 associated with the integrated circuit 220. Based on the analysis, the access server 250 may grant the device 210 access to the network 202.

As an example, the other information may be a particular gateway identifier 216. In these and other embodiments, the access server 250 may verify the credentials 222 and determine a gateway identifier associated with the credentials 222. The access server 250 may verify that the gateway identifier associated with the credentials 222 matches the gateway identifier 216 provided by the device 210. In response to a match, the access server 250 may grant the device 210 access to the network 202. As another example, the other information may be a model or type of the device 210 such that the credentials 222 are not associated with a particular device, but a type of device. In these and other embodiments, the access server 250 may store the association between the credentials 222 and the device 210 or after verifying the credentials 222 may request the other information from another source, such as the transcription system 230.

In some embodiments, the gateway identifier 216 may be configured such that the access server 250 connects the device 210 to a specific network, such as a network associated with the transcription system 230. As a result, the configuration of the gateway identifier 216 may limit data transmitted and received over the network 202 to data associated with the transcription system 230. As an example implementation, the gateway identifier 216 may be configured to point to a network associated with the transcription system 230. The device 210 may be preconfigured with the gateway identifier 216. As such, the access server 250 may form a link through the network 202 between the network associated with the transcription system 230 and the device 210. As a result, the device 210 may not be connected to the Internet or other networks and thereby cannot request or send data other than data associated with the transcription system 230.

In some embodiments, the gateway identifier 216 may be configured to point to a particular server or a virtual server, such as a proxy server 236 associated with the transcription system 230. In these and other embodiments, the proxy server 236 may be configured to forward messages to other servers associated with the transcription system 230, such as a first server 232 and a second server 234. Thus, the gateway identifier 216 may be configured to point to an individual server, the proxy server 236, for a connection through the network 202. The proxy server 236 may redirect requests to appropriate servers within the transcription system 230.

In some embodiments, to limit data transmitted and received over the network 202 to data associated with the transcription system 230, the device 210 may be configured to only access a particular website, IP address, range of IP addresses, URL, sub-domain, domain, or other destination. One or more of the destinations may be associated with the transcription system 230. As a result, the device 210 may not be configured to establish connections with websites associated with other domains. For example, an administration server may configure the device 210 and/or access server 250 with one or more destinations or lists of destinations that may or may not be allowed. The device 210 and/or access server 250 may allow the device 210 to transmit and/or receive information to/from allowed destinations and block information to/from disallowed destinations.

Modifications, additions, or omissions may be made to the environment 200 and/or the components operating in the environment 200 without departing from the scope of the present disclosure. For example, other devices, such as the devices illustrated in the environment 100 of FIG. 1 may be used in the environment 200.

Figure 3:
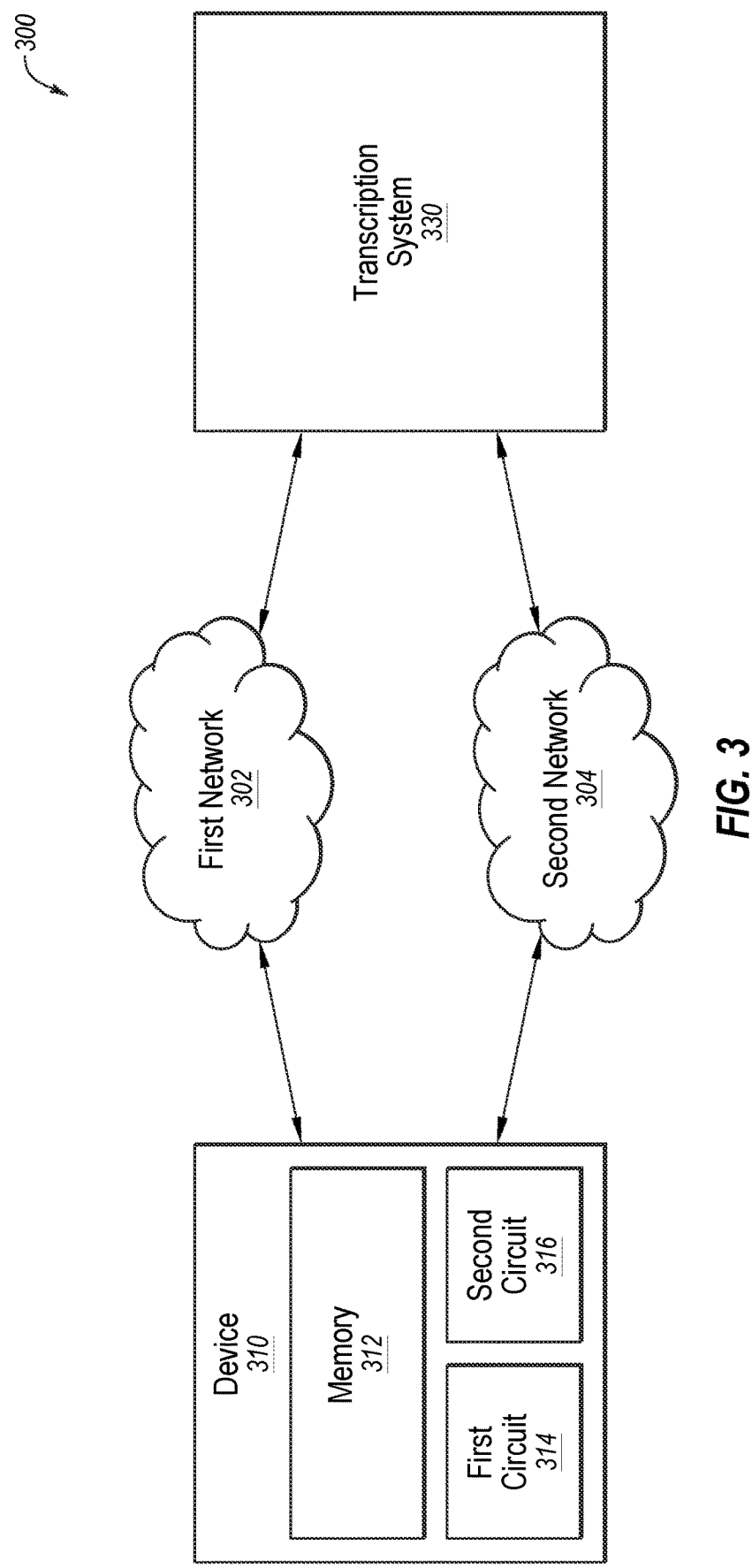
FIG. 3 illustrates another example environment for communication of transcriptions.

FIG. 3 illustrates another example environment 300 for communication of transcriptions. The environment 300 may be arranged in accordance with at least one embodiment described in the present disclosure. The environment 300 may include a first network 302, a second network 304, a device 310, and a transcription system 330.

In some embodiments, the device 310 and the transcription system 330 may include various aspects that are analogous to the second device 114 and the transcription system 130, respectively, of FIG. 1. Accordingly, only further explanation is provided with respect thereto and the description of FIG. 1 is applicable to the description of FIG. 3. Furthermore, the first network 302 and the second network 304 may include various aspects that are analogous to the third network 106 of FIG. 1. Accordingly, only further explanation is provided with respect thereto and the description of FIG. 1 is applicable to the description of FIG. 3.

The device 310 may include a memory 312, a first integrated circuit 314, and a second integrated circuit 316. The first integrated circuit 314, and the second integrated circuit 316 may include various aspects that are analogous to the integrated circuit 220 of FIG. 2. Accordingly, only further explanation is provided with respect thereto and the description of FIG. 2 is applicable to the description of FIG. 3.

In some embodiments, the first network 302 may be of the same type as the second network 304. However, the first network 302 and the second network 304 may be different networks. For example, the first network 302 and the second network 304 may each be wireless data network, such as a 3G, 4G, LTE, satellite, or 5G data network that are maintained by different wireless telecommunications providers. In some embodiments, the first network 302 and/or the second network 304 may each be a wired data network, such as DSL, cable Internet, a fiber network, Ethernet, or a wired LAN or WAN. In these and other embodiments, the first integrated circuit 314 may be associated with the first network 302 and may include credentials that may allow the device 310 to access the first network 302. Alternately or additionally, the second integrated circuit 316 may be associated with the second network 304 and may include credentials that may allow the device 310 to access the second network 304. Both of the first network 302 and the second network 304 may independently couple the device 310 to the transcription system 330 to allow communication therebetween.

In some embodiments, a determination may be made regarding which network, selecting from the first network 302, the second network 304, or a combination of the first network 302 and the second network 304, to use for communication between the transcription system 330 and the device 310.

In some embodiments, the determination of which network to use may be based on one or more criteria. For example, the criteria may include a signal strength, upload connection speeds, download connection speeds, cost of data transmission, performance statistics for communication between the transcription system 330 and the device 310, measures of how fully loaded a network is such as average network traffic estimates, signals or messages indicating network status such as outages or loss of connections, among other criteria. In these and other embodiments, performance statistics for communication between the transcription system 330 and the device 310 may include a percentage of time communication is available; a number, frequency, and/or length of interruptions of communication; and performance with respect the particular data being transmitted, such as the transmission of audio to the transcription system 330 and transmission of transcriptions to the device 310.

In some embodiments, the determination of which network to use may be based on evaluating the networks individually. In these and other embodiments, if one of the networks does not meet a particular threshold, a different network may be selected. Alternately or additionally, the determination of which network to use may be based on a comparison among the different networks. For example, the comparison among the different networks may be made based on scoring for each of the network. In these and other embodiments, each of the different criteria for each of the networks may be assigned a score. The score for each network may be a sum of the scores for each of the criteria. In these and other embodiments, the network with the highest or most favorable score may be selected for use.

In some embodiments, the determination of which network to use may be performed at different intervals or continuously. In these and other embodiments, the intervals may be at particular or random time periods; at a particular or random number of communication sessions or portions of communication sessions, such as portions of a communication session separated by silence; at particular or random amount of data exchanged between the transcription system 330 and the device 310; at the start or end of each communication session; or some other interval. As a result, in some embodiments, the selected network may change between communication sessions and/or during a single communication session. In these and other embodiments, when the selected network changes during a communication session, the change may occur during a period when data exchanged between the transcription system 330 and the device 310 is not occurring, such as during periods of silence or when the remote device is not providing audio with speech.

Modifications, additions, or omissions may be made to the environment 300 and/or the components operating in the environment 300 without departing from the scope of the present disclosure. For example, other devices, such as the devices illustrated in the environment 100 of FIG. 1 may be used in the environment 300. Alternately or additionally, the configuration of the environment 200 of FIG. 2 may be used in the environment 300. Alternately or additionally, the environment 300 may include additional networks connecting the device 310 and transcription system 330 or in series with the first network 302 or second network 304. These additional networks may be used and selected using methods and criteria as described above for the first network 302 and the second network 304.

Figure 4:
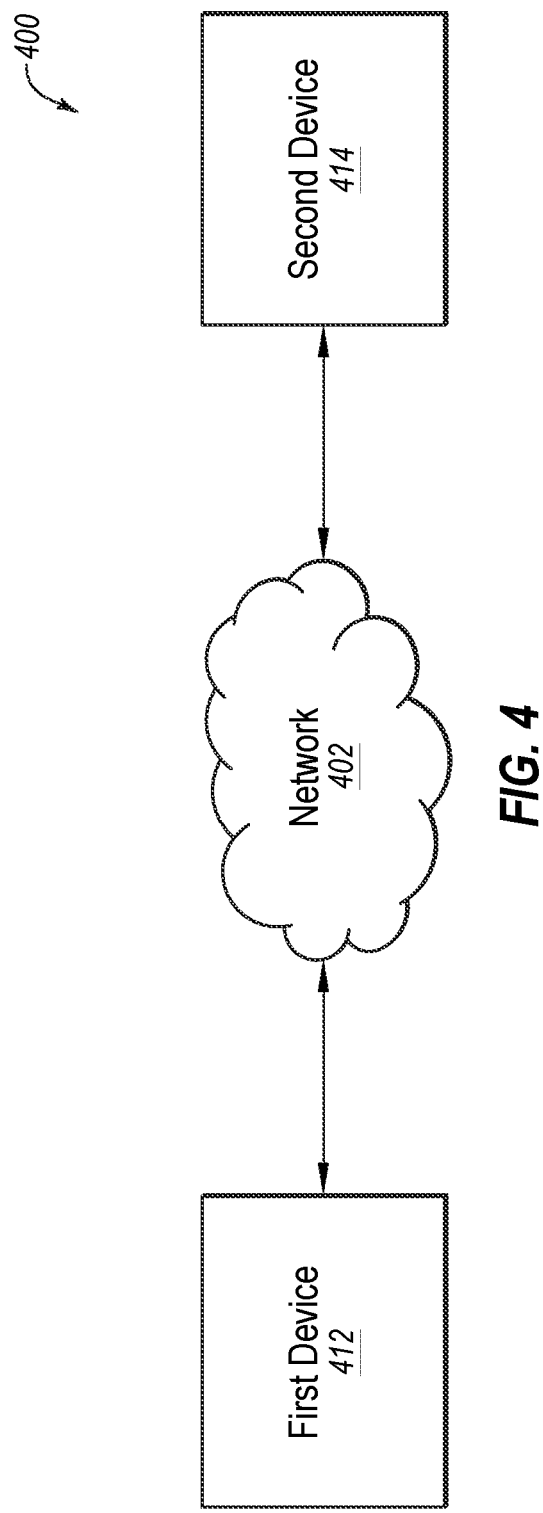
FIG. 4 illustrates another example environment for communication of transcriptions.

FIG. 4 illustrates another example environment 400 for communication of transcriptions. The environment 400 may be arranged in accordance with at least one embodiment described in the present disclosure. The environment 400 may include a network 402, a first device 412, and a second device 414.

In some embodiments, the network 402, the first device 412, and the second device 414 may include various aspects that are analogous to the second network 104, the first device 112, and the second device 114, respectively, of FIG. 1. Alternately or additionally, the network 402, the first device 412, and the second device 414 may include various aspects that are analogous to the third network 106, the second device 114, and the transcription system 130, respectively, of FIG. 1. Accordingly, only further explanation is provided with respect thereto and the description of FIG. 1 is applicable to the description of FIG. 4.

In some embodiments, the network 402 may be configured to such that only authorized devices may access the network 402 and provide data to the second device 414. An example of an authorized device may be the first device 412. In these and other embodiments, the second device 414 may provide data obtained over the network 402 to another device or system, such as a transcription system over another network.

In some embodiments, the network 402 may be controlled by the second device 414. In these and other embodiments, the second device 414 may grant the first device 412 access to the network 402 based on credentials supplied by the first device 412 to the second device 414. The first device 412 may obtain the credentials using one or more methods. The credentials may include a MAC address, passwords, a client certification, a device name, a device type, a global or local IP address, a URL, a password, an IMEI, key exchanges, among other credentials.

In some embodiments, the first device 412 may obtain credentials to access the network 402 based on information stored in the first device 412. For example, the first device 412 may be manufactured to include the credentials to access the network 402. In these and other embodiments, the first device 412 may include particular credentials that are set based on credentials for the second device 414.

In some embodiments, the first device 412 may obtain credentials to access the network 402 based on requesting information. For example, the first device 412 may be configured to request information from a user. In these and other embodiments, the first device 412 may obtain information from the user that may be used to access the network 402. The information may include one or more of an identifier of the network 402 such as the SSID and a password, a fingerprint, face identification, voiceprint, or other biometric reading of the user, among other information.

In some embodiments, the first device 412 may obtain information from another device connected to the network 402 that may be used by the first device 412 to access the network. Alternately or additionally, the first device 412 may obtain the information from another system. In these and other embodiments, the first device 412 may have previously provided the information to the system. Alternately or additionally, the system may include part or all of the information. In these and other embodiments, the first device 412 may provide identifying information, such as the SSID of the network or other information about the first device 412 to the other system. The other system may determine the remaining information for the first device 412 to access the network 402 and provide the remaining information to the first device 412. In these and other embodiments, the first device 412 may communicate with the other system using a network, such as the first network 102 of FIG. 1, for example using dual-tone multi-frequency (DTMF) signaling over an analog voice network.

In some embodiments, the second device 414 may include a whitelist of device identifiers, such as a media access control (MAC) address, that the second device 414 may allow to access the network 402. Thus, if a device does not include a device identifier on the whitelist, the second device 414 may deny the device access to the network 402. In these and other embodiments, the first device 412 may include a device identifier that is on the whitelist to allow the first device 412 to access the network 402. Alternately or additionally, the whitelist may only include a portion of the device identifiers. In these and other embodiments, in response to a device including the matching portion of the device identifier then the device may be allowed to join the network 402. For example, multiple devices may be configured with MAC addresses that contain a first string (e.g. XX:XX:XX:XX, for example, "12:3D:C8:90") that is shared among the devices and a second string (e.g. AA:BB) that is unique to the device, so that the full MAC address appears as, for example, 12:3D:C8:90:AA:BB. The second device 414 may grant devices access to the network 402 where the MAC address includes the first string (12:3D:C8:90). In these and other embodiments, the second device 414 may include the whitelist. Alternately or additionally, another system may include the whitelist. In these and other embodiments, the second device 414 may communicate with the other system before granting a device access to the network 402.

In some embodiments, access to the network 402 may be controlled based on a pairing scheme. For example, the first device 412 and the second device 414 may be paired using a wired cable. During the wired pairing, the credentials for the network 402 may be shared and established. As another example, the first device 412 may host a network before the creation of the network 402. The network may allow the second device 414 to join the network. The second device 414 may exchange information after the second device 414 joins the network. The information may include credentials to allow the second device 414 to verify the first device 412. For example, the credentials may include any of the credentials discussed in this disclosure that may be used to allow access to the network. After verifying the first device 412, the second device 414 may share credentials for the first device 412 to access the network 402. For example, the second device 414 may provide the first device 412 a particular SSID, frequency range, or other information that may not be broadcast or available for other devices to discover or join the network 402. The second device 414 may also provide the first device 412 credentials that may be used to join the network 402 after discovering the network.

In some embodiments, after sharing the information for the network 402, the first device 412 may drop the network and the second device 414 may create the network 402. The first device 412 may join the network 402 using the information shared while the first device 412 and the second device 414 communicated using the network hosted by the first device 412.

Modifications, additions, or omissions may be made to the environment 400 and/or the components operating in the environment 400 without departing from the scope of the present disclosure. For example, other devices, such as the devices illustrated in the environment 100 of FIG. 1 may be used in the environment 400. Alternately or additionally, the configuration of the environment 200 of FIG. 2 may be used in the environment 400. Alternately or additionally, the configuration of the environment 300 of FIG. 3 may be used in the environment 400.

Figure 5:
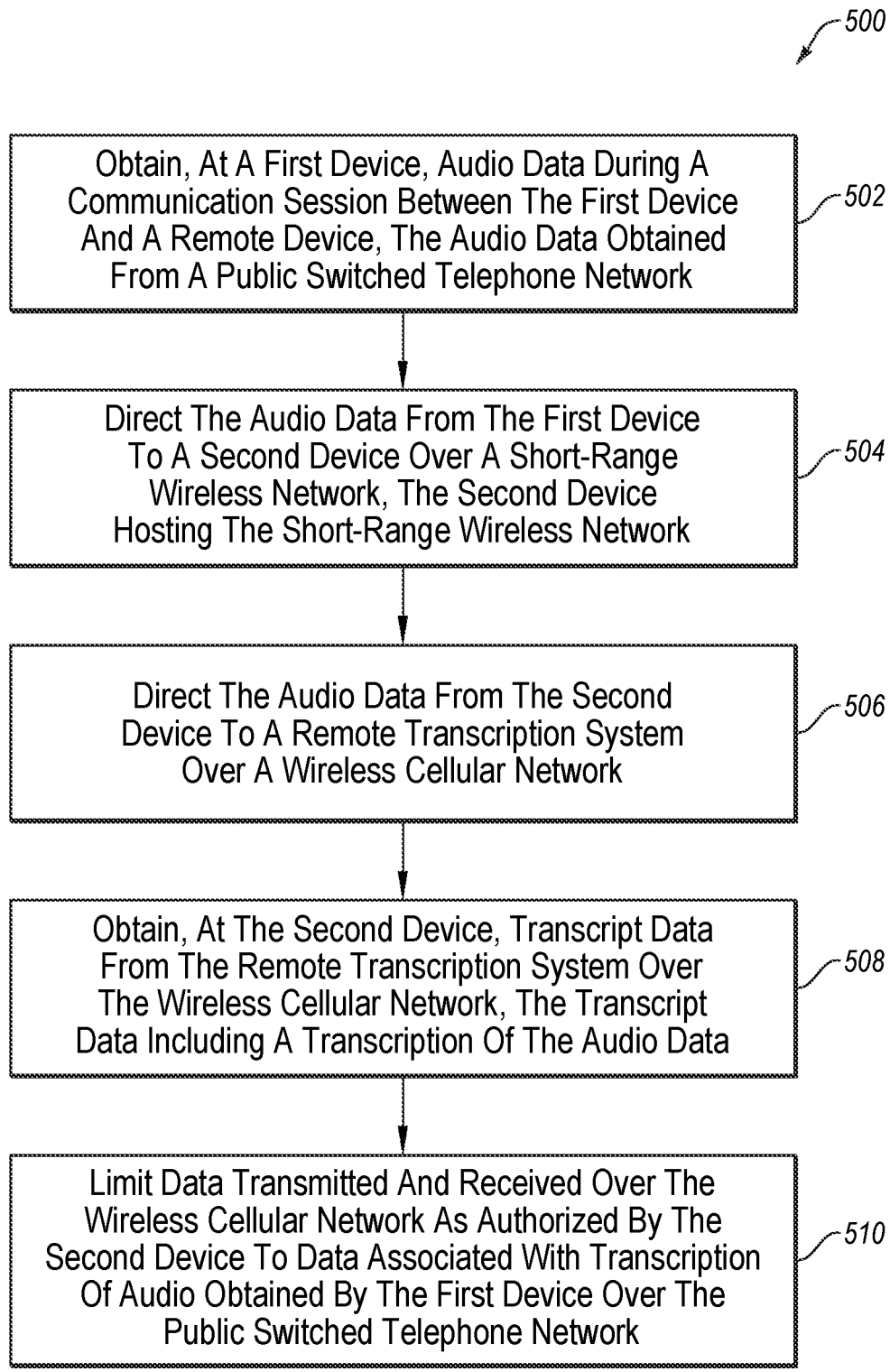
FIG. 5 is a flowchart of an example method of communication of transcriptions.

FIG. 5 is a flowchart of another example method 500 of communication of transcriptions. The method 500 may be arranged in accordance with at least one embodiment described in the present disclosure. The method 500 may be performed, in some embodiments, by a system, such as systems illustrated in FIG. 1, FIG. 2, FIG. 3, or FIG. 4, or another system. In these and other embodiments, the method 500 may be performed by a system based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where audio data may be obtained at a first device during a communication session between the first device and a remote device. In some embodiments, the audio data may be obtained from a public switched telephone network.

At block 504, the audio data may be directed from the first device to a second device over a short-range wireless network. In some embodiments, the second device may host the short-range wireless network. In some embodiments, the first device and second device may be clients on the short-range wireless network.

At block 506, the audio data may be directed from the second device to a remote transcription system over a wireless cellular network.

At block 508, transcript data at the second device may be obtained from the remote transcription system over the wireless cellular network. In some embodiments, the transcript data may include a transcription of the audio data.

At block 510, data transmitted and received over the wireless cellular network as authorized by the second device may be limited to data associated with transcription of audio obtained by the first device over the public switched telephone network.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, limiting data transmitted and received over the wireless cellular network as authorized by the second device may include limiting an integrated circuit with credentials to access the wireless cellular network to use by the second device. In these and other embodiments, the integrated circuit may be removably coupled to the second device.

In some embodiments, limiting the integrated circuit with the credentials to access the wireless cellular network to use by the second device may include directing association of an identifier of the integrated circuit with a particular gateway identifier stored by the second device such that the wireless cellular network denies network access when receiving the identifier of the integrated circuit without the particular gateway identifier.

In some embodiments, limiting the integrated circuit with the credentials to access the wireless cellular network to use by the second device may include directing construction of a table indicating a correspondence between an identifier of the second device and the credentials of the integrated circuit and in response to the identifier of the integrated circuit being used to authenticate a device to access the wireless cellular network, providing for comparison of an identifier of the device to the identifier of the second device.

In some embodiments, in response to the identifier of the device not matching the identifier of the second device based on the comparison, performing one or more of the following: disabling the second device, directing disabling of the credentials of the integrated circuit, and restricting usage of the remote transcription system of a user associated with the first device and the second device.

In some embodiments, limiting data transmitted and received over the wireless cellular network as authorized by the second device to data associated with transcription of audio may include restricting, by the second device, access to the Internet to a single Internet protocol sub-domain or to a particular list of Internet protocol subdomains.

In some embodiments, limiting data transmitted and received over the wireless cellular network as authorized by the second device to data associated with transcription of audio includes directing restriction, by the wireless cellular network, of access to the Internet to a single Internet protocol sub-domain based on a particular gateway identifier stored by the second device and provided to the wireless cellular network.

In some embodiments, limiting data transmitted and received over the wireless cellular network as authorized by the second device to data associated with transcription of audio may include: monitoring an amount of data transmitted and received over the wireless cellular network, determining an estimated amount of data to be transmitted and received over the wireless cellular network based on an amount of audio data provided for transcription to the remote transcription system, determining a difference between or ratio of the amount of data and the estimated amount of data; and in response to the difference or ratio satisfying a threshold, performing one or more of the following: disabling the second device; directing disabling of credentials of an integrated circuit included in the second device, the credentials used by the second device to access the wireless cellular network; and restricting usage of the remote transcription system of a user associated with the first device and the second device.

In some embodiments, limiting data transmitted and received over the wireless cellular network as authorized by the second device to data associated with transcription of audio may include obtaining, by the second device, one or more device identifiers and restricting, by the second device, access to the short-range wireless network to devices that provide one of the one or more device identifiers.

In some embodiments, limiting data transmitted and received over the wireless cellular network as authorized by the second device to data associated with transcription of audio may include hosting, by the first device, a second short-range wireless network; accessing, by the second device, the second short-range wireless network; and in response to accessing the second short-range wireless network, negotiating a connection between the first device and the second device using the short-range wireless network hosted by the second device.

Figure 6:
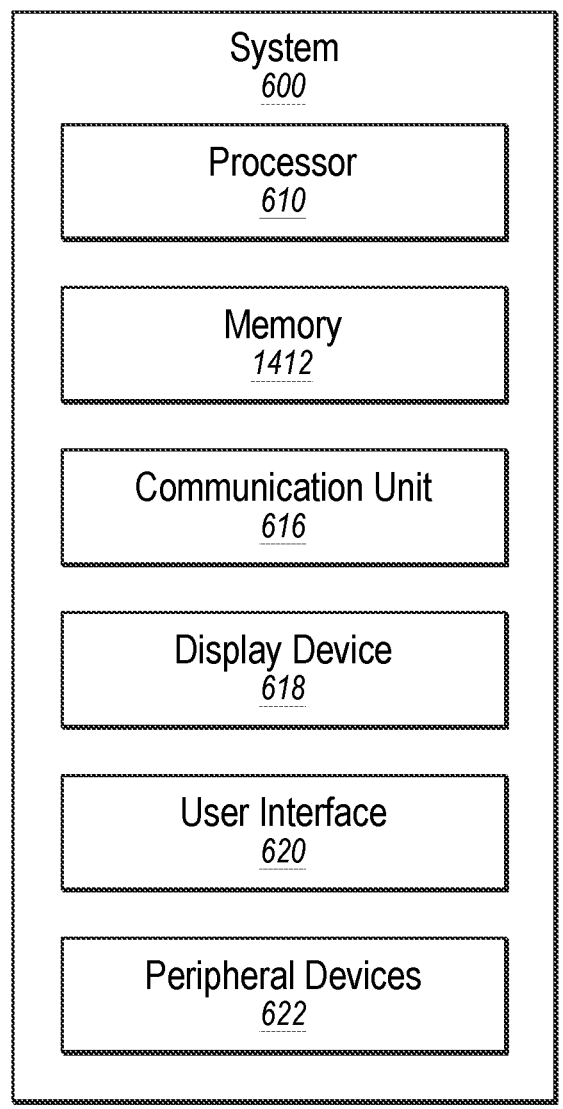
FIG. 6 illustrates an example system that may be used during communication of transcriptions.

FIG. 6 illustrates an example system 600 that may be used during transfer of communication between devices as described in this disclosure. The system 600 may include a processor 610, memory 612, a communication unit 616, a display device 618, a user interface unit 620, and a peripheral device 622, which all may be communicatively coupled. In some embodiments, the system 600 may be part of any of the systems or devices described in this disclosure.

For example, the system 600 may be part of the environment 100 of FIG. 1 and may be configured to perform one or more of the tasks described above with respect to the first device 112. As another example, the system 600 may be part of the environment of FIG. 2 and may be configured to perform one or more of the tasks described above with respect to the device 210 or the transcription system 230.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), graphics processing unit (GPU), vector or array processor, a SIMD (single instruction multiple data) or other parallel processor, or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to operations for generating transcriptions such that the system 600 may perform or direct the performance of the operations associated therewith as directed by the instructions.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), a telephone jack, and/or the like. The communication unit 616 may permit data to be exchanged with a network and/or any other devices or systems described in the present disclosure.

The display device 618 may be configured as one or more displays that present images, words, etc., like an LCD, LED, OLED, projector, or other type of display. The display device 618 may be configured to present video, text captions, user interfaces, and other data as directed by the processor 610. For example, when the system 600 is included in the first device 112 of FIG. 1, the display device 618 may be configured to present transcriptions.

The user interface unit 620 may include any device to allow a user to interface with the system 600. For example, the user interface unit 620 may include a mouse, a track pad, a keyboard, buttons, and/or a touchscreen, among other devices. The user interface unit 620 may receive input from a user and provide the input to the processor 610. In some embodiments, the user interface unit 620 and the display device 618 may be combined.

The peripheral devices 622 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may present audio received by the system 600 or otherwise generated by the system 600 by broadcasting the audio.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a special purpose or general purpose computer (e.g., the processor 610 of FIG. 6) including various computer hardware or software modules, as discussed in greater detail below. Further, as indicated above, embodiments described herein may be implemented using computer-readable media (e.g., the memory 612 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first, "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

We claim:

1. A method of transcription communication comprising:
obtaining, at a first device, audio data during a communication session between the first device and a remote device, the audio data obtained from a public switched telephone network;
directing the audio data from the first device to a second device over a short-range wireless network, the second device hosting the short-range wireless network;
directing the audio data from the second device to a remote transcription system over a wireless cellular network;
obtaining, at the second device, transcript data from the remote transcription system over the wireless cellular network, the transcript data including a transcription of the audio data; and
limiting data transmitted and received over the wireless cellular network as authorized by the second device to data associated with transcription of audio obtained by the first device over the public switched telephone network.

2. The method of claim 1, wherein limiting data transmitted and received over the wireless cellular network as authorized by the second device includes limiting an integrated circuit with credentials to access the wireless cellular network to use by the second device, wherein the integrated circuit is removably coupled to the second device.

3. The method of claim 2, wherein limiting the integrated circuit with the credentials to access the wireless cellular network to use by the second device includes directing association of an identifier of the integrated circuit with a particular gateway identifier stored by the second device such that the wireless cellular network denies network access when receiving the identifier of the integrated circuit without the particular gateway identifier.

4. The method of claim 2, wherein limiting the integrated circuit with the credentials to access the wireless cellular network to use by the second device includes directing association of an identifier of the integrated circuit with a particular gateway identifier such that the wireless cellular network denies network access when receiving the identifier of the integrated circuit that does not correspond to the particular gateway identifier.

5. The method of claim 1, wherein limiting data transmitted and received over the wireless cellular network as authorized by the second device to data associated with transcription of audio includes restricting, by the second device, access to the Internet to a single Internet protocol sub-domain or to particular Internet protocol subdomains.

6. The method of claim 1, wherein limiting data transmitted and received over the wireless cellular network as authorized by the second device to data associated with transcription of audio includes directing restriction, by the wireless cellular network, access to the Internet to a single Internet protocol sub-domain or to particular Internet protocol subdomains based on a particular gateway identifier stored by the second device and provided to the wireless cellular network.

7. The method of claim 1, wherein limiting data transmitted and received over the wireless cellular network as authorized by the second device to data associated with transcription of audio includes:
monitoring an amount of data received over the wireless cellular network;
determining an estimated amount of data to be received over the wireless cellular network based on an amount of transcription data provided by the remote transcription system;
determining a difference or ratio between the amount of data and the estimated amount of data; and
in response to the difference or the ratio satisfying a threshold, restricting usage of the remote transcription system of a user associated with the first device and the second device.

8. The method of claim 1, wherein limiting data transmitted and received over the wireless cellular network as authorized by the second device to data associated with transcription of audio includes:
hosting, by the first device, a second short-range wireless network;
accessing, by the second device, the second short-range wireless network; and
in response to accessing the second short-range wireless network, negotiating a connection between the first device and the second device using the short-range wireless network hosted by the second device.

9. The method of claim 8, wherein the short-range wireless network is a closed wireless network.

10. At least one non-transitory computer-readable media configured to store one or more instructions that, in response to being executed by a system, cause or direct the system to perform operations comprising:
obtaining, at a first device, audio data during a communication session between the first device and a remote device, the audio data obtained from a public switched telephone network;
directing the audio data from the first device to a second device over a short-range wireless network, the second device hosting the short-range wireless network;
directing the audio data from the second device to a remote transcription system over a wireless cellular network;
obtaining, at the second device, transcript data from the remote transcription system over the wireless cellular network, the transcript data including a transcription of the audio data; and
limiting data transmitted and received over the wireless cellular network as authorized by the second device to data associated with transcription of audio obtained by the first device over the public switched telephone network.

11. The computer-readable media of claim 10, wherein limiting data transmitted and received over the wireless cellular network as authorized by the second device includes limiting an integrated circuit with credentials to access the wireless cellular network to use by the second device, wherein the integrated circuit is removably coupled to the second device.

12. The computer-readable media of claim 11, wherein limiting the integrated circuit with the credentials to access the wireless cellular network to use by the second device includes directing association of an identifier of the integrated circuit with a particular gateway identifier stored by the second device such that the wireless cellular network denies network access when receiving the identifier of the integrated circuit without the particular gateway identifier.

13. The computer-readable media of claim 11, wherein limiting the integrated circuit with the credentials to access the wireless cellular network to use by the second device includes directing association of an identifier of the integrated circuit with a particular gateway identifier such that the wireless cellular network denies network access when receiving the identifier of the integrated circuit that does not correspond to the particular gateway identifier.

14. The computer-readable media of claim 10, wherein limiting data transmitted and received over the wireless cellular network as authorized by the second device to data associated with transcription of audio includes restricting, by the second device, access to the Internet to a single Internet protocol sub-domain or to particular Internet protocol subdomains.

15. The computer-readable media of claim 10, wherein limiting data transmitted and received over the wireless cellular network as authorized by the second device to data associated with transcription of audio includes directing restriction, by the wireless cellular network, to access to the Internet to a single Internet protocol sub-domain or to particular Internet protocol subdomains based on a particular gateway identifier stored by the second device and provided to the wireless cellular network.

16. The computer-readable media of claim 10, wherein limiting data transmitted and received over the wireless cellular network as authorized by the second device to data associated with transcription of audio includes:

monitoring an amount of data transmitted and received over the wireless cellular network;

determining an estimated amount of data to be transmitted and received over the wireless cellular network based on an amount of audio data provided for transcription to the remote transcription system;

determining a difference or ratio between the amount of data and the estimated amount of data; and in response to the difference or ratio satisfying a threshold, restricting usage of the remote transcription system of a user associated with the first device and the second device.

17. The computer-readable media of claim 10, wherein limiting data transmitted and received over the wireless cellular network as authorized by the second device to data associated with transcription of audio includes:

hosting, by the first device, a second short-range wireless network;

accessing, by the second device, the second short-range wireless network; and in response to accessing the second short-range wireless network, negotiating a connection between the first device and the second device using the short-range wireless network hosted by the second device.

18. The computer-readable media of claim 17, wherein the short-range wireless network is a closed wireless network.

* * * * *